United States Patent [19]

Murata et al.

[11] Patent Number: 4,798,272

[45] Date of Patent: Jan. 17, 1989

[54] HYDRAULICALLY OPERATED FRICTION CLUTCH HAVING AUTOMATIC WEAR COMPENSATING VALVE

[75] Inventors: Kiyohito Murata, Susono; Fumihiro Ushijima, Okazaki, both of Japan

[73] Assignee: Toyota Jidosha Kabushiki Kaisha, Toyota, Japan

[21] Appl. No.: 33,616

[22] Filed: Apr. 3, 1987

[30] Foreign Application Priority Data

Apr. 4, 1986 [JP] Japan .................................. 61-78845

[51] Int. Cl.⁴ ..................... F16D 13/75; F16D 25/063
[52] U.S. Cl. ........................... 192/70.25; 192/85 AA; 192/111 A
[58] Field of Search .......... 192/70.25, 85 AA, 111 A, 192/109 F; 188/71.8, 196 A

[56] References Cited

U.S. PATENT DOCUMENTS 3,421,608 1/1969 Van Gorder ................... 192/85 AA
4,325,471 4/1982 Schuster ......................... 192/85 AA

FOREIGN PATENT DOCUMENTS 60-11722 1/1985 Japan .
60-79024 6/1985 Japan .
1483860 8/1977 United Kingdom .

Primary Examiner—Leslie A. Braun
Assistant Examiner—Richard M. Lorence
Attorney, Agent, or Firm—Oblon, Fisher, Spivak, McClelland & Maier

[57] ABSTRACT

A hydraulically operated friction clutch, having a driving and a driven rotary member frictionally engageable with each other, a movable member axially movable for frictional engagement of the driving and driven rotary members, and an actuator piston axially slidable by a pressure in a pressure chamber, for moving the movable member. The actuator piston has a control passage which communicates with the pressure chamber and a discharge passage. The clutch further has a shut-off valve disposed in operative association with the actuator piston and the movable member. The shut-off valve includes a closure member which is movable relative to the actuator piston and which has a first position for closing the control passage, and a second position for opening the control passage. The closure member is placed in the second position when the actuator piston has been moved to a predetermined ready-to-operate position which is a predetermined first distance away from the movable member. The discharge passage is opened and closed according to signals from a controller.

13 Claims, 2 Drawing Sheets

HYDRAULICALLY OPERATED FRICTION CLUTCH HAVING AUTOMATIC WEAR COMPENSATING VALVE

BACKGROUND OF THE INVENTION

1. Field of the Invention

The present invention relates generally to a hydraulically operated friction coupling clutch, and more particularly to a technique for improved consistency in engagement respose and easier control of the clutch, irrespective of an amount of wear of friction members of the clutch.

2. Discussion of the Prior Art

There is known a hydraulically operated clutch which has a driving rotary member, a driven rotary member, a movable member for effecting frictional engagement between the driving and driven rotary members, a cylinder bore, an actuator piston slidably received in the cylinder bore and cooperating with the cylinder bore to define a pressure chamber, so that the piston is moved by a hydraulic pressure in the pressure chamber, to move the movable piston for frictionally coupling the driving and driven rotary members to each other. An example of this type of hydraulically operated clutch is disclosed in Laid-Open Publication No. 60-79024 (published in 1985) of Japanese Patent Application.

In such type of conventional hydraulically operated clutch, a distance of movement of the piston required for the piston to commence moving the movable member to start engagement of the clutch is inevitably increased due to progressive wear of the friction members of the clutch during use. This means an increase in the amount of flow of the working fluid necessary to engage the clutch, resulting in an increase in the engagement time of the clutch, or a prolonged response time of the clutch. Therefore, where the clutch is used for an automotive vehicle, the frictional coupling characteristic of the clutch upon starting of the vehicle or shifting of the transmission is changed or deteriorated as the service life of the clutch increases.

To eliminate the above drawback, there has been proposed a solution as described in Laid-Open Publication No. 60-11722, in which the engagement start position of the clutch which varies with the amount of wear of the friction members, is detected and stored in a memory. In this proposed arrangement, the clutch engagement action is controlled based on the updated data stored in the memory. However, this arrangement required a complicated control system.

SUMMARY OF THE INVENTION

It is accordingly an object of the present invention to provide a hydraulically operated friction clutch which has a consistent operating characteristic or response, irrespective of a progressively increasing amount of wear of friction members incorporated therein.

According to the present invention, there is provided a hydraulically operated friction clutch, comprising (a) a driving and a driven rotary member frictionally engageable with each other, (b) a movable member disposed coaxially with the driving and driven rotary members and axially movable for frictional engagement of the driving and driven rotary members with each other, (c) means for defining a cylinder bore, (d) an actuator piston axially slidably received within the cylinder bore and cooperating with the cylinder bore to define a pressure chamber, (e) a first control valve for applying a hydraulic pressure to the pressure chamber and thereby moving the movable member for the frictional engagement of the driving and driven rotary members, (f) means for defining a discharge passage leading to a drain, the actuator piston having a control passage which communicates at opposite ends thereof with the pressure chamber and the discharge passage, (g) a shut-off valve disposed in operative association with the actuator piston and the movable member, the shut-off valve including a closure member which is movable relative to the actuator piston and which has a first position for closing the control passage, and a second position for opening the control passage, the closure member being placed in the second position when the actuator piston has been moved to a predetermined ready-to-operate position which is a predetermined first distance away from the movable member, (h) a second control valve disposed in the discharge passage, for opening and closing the discharge passage, and (i) a controller generating electric signals for controlling the first and second control valves.

In the hydraulically operated friction clutch of the present invention constructed as described above, the control passage is opened when the actuator piston is moved to the predetermined ready-to-operate position relative to the movable member. In other words, the movement of the actuator piston toward the movable member is stopped at the ready-to-operate position, since the hydraulic pressure in the pressure chamber is released through the open control passage, and through the discharge passage opened by the second control valve. Thus, the actuator piston may be positioned near the movable member, i.e., at the ready-to-operate position, before the actuator piston abuts on the movable member to commence the frictional engagement of the driving and driven rotary members. According to the instant arrangement, the distance between the ready-to-operate position of the actuator piston, and the movable member is constant, irrespective of a progressively increasing amount of wear of the friction members used in the clutch. That is, the ready-to-operate position is shifted toward the movable member, as the amount of friction of the friction members increases, thereby compensating for the wear of the friction clutch.

When the discharge passage is closed by the second control valve, the pressure in the pressure chamber increases, thereby moving the actuator piston from the ready-to-operate position, and forcing the movable member for effecting the frictional engagement of the driving and driven rotary members.

Since the distance between the ready-to-operate position of the actuator piston and the movable member is constant without dependence upon the wear amount of the clutch, the same amount of flow of the working fluid is required for moving the actuator piston for abutment on the movable member. Accordingly, the friction clutch is engaged with a constant response to a command from the controller to start a frictional coupling action, and the frictional coupling of the driving and driven members is completed in a constant length of time irrespective of the wear amount of the clutch. Therefore, if the instant clutch is used in a power transmitting system of an automotive vehicle, stable engaging actions of the clutch assure consistently smooth starting of the vehicle and gear shifting actions of a transmission of the system. Further, since the ready-tooperate position of the actuator piston is automatically shifted according to an increasing amount of wear of the friction clutch, the controller does not require a conventionally used complicated electronic arrangement for storing, updating and retrieving data indicative of detected amount of wear of the clutch. Accordingly, the controller for the clutch may be made simpler and less expensive.

According to one feature of the invention, the actuator piston is disposed in coaxial relation with the driving and driven rotary members. In one form of this feature, the driving rotary member includes a friction plate, and the movable member consists of a pressure plate which is disposed axially movably between the actuator piston and the pressure plate. The driven rotary member is disposed between the pressure plate and the friction plate so that the driven rotary member is forced by the pressure plate against the friction plate upon movement of the actuator piston from the ready-to-operate position toward the driven rotary member.

According to another feature of the invention, the shut-off valve is slidably supported by the actuator piston. In one preferred form of this feature, the actuator piston has a through-hole, and the shut-off valve includes a shaft member slidably received within the through-hole such that one of opposite axial ends thereof projects a predetermined second distance from a surface of the actuator piston facing the movable member, when the closure member is placed in the first position. It will be understood that the first distance is smaller than the second distance, since the shut-off valve must be at least partially opened when the actuator piston is located at the ready-to-operate position. The closure member may be integrally secured to the other axial end of the shaft member, or may be a member separate from the shaft member provided that the closure member is movable to the second open position by an axial movement of the shaft member.

According to a further feature of the invention, the actuator piston has a recess exposed to the pressure chamber, and the closure member is movably received in the recess. In this case, the control passage is open in the recess at one of its opposite ends so that the above one end of the control passage is closed by the closure member placed in its first position.

According to a still further feature of the invention, the first control valve has a supply position for supplying a pressurized fluid to the pressure chamber, and a discharge position for permitting the fluid to be discharged from the pressure chamber to the drain, and the second control valve has an open position for opening the discharge passage, and a closed position for closing the discharge passage. In this arrangement, the controller is adapted to place the first control valve in the supply position and the second control valve in the closed position, for effecting the frictional engagement of the driving and driven rotary members. When the friction clutch is disengaged, the controller operates to place at least one of the first and second control valves in corresponding one of the discharge and open positions for releasing the frictional engagement of the driving and driven rotary members. After the friction clutch is disengaged, the controller operates to place the first control valve in the supply position, and the second control valve in the open position, to move the actuator piston to the ready-to-operate position before the next frictional engagement of the driving and driven rotary members.

According to a yet further feature of the invention, the driving rotary member comprises a housing in which the driven rotary member, the movable member and the actuator piston are accommodated, such that the movable member and the actuator piston are rotatable with the housing, relative to the driven rotary member, while the friction clutch is disengaged. In one form of this feature, the friction clutch further comprises an input shaft to which the housing is fixed, and an output shaft, and the driven rotary member includes a rotor splined on the output shaft.

The instant friction clutch may be suitably used for transmitting power from an engine of a motor vehicle to a transmission having a plurality of gear positions. In this case, the driving rotary member is operatively connected to the engine.

BRIEF DESCRIPTION OF THE DRAWINGS

The foregoing and optional objects, features and advantages of the present invention will become more apparent by reading the following detailed description of a preferred embodiment of the invention, when considered in conjunction with the accompanying drawings, in which.

DETAILED DESCRIPTION OF THE PREFERRED EMBODIMENT

The preferred embodiment of the invention will be described in detail, by reference to the accompanying drawings.

Figure 1:
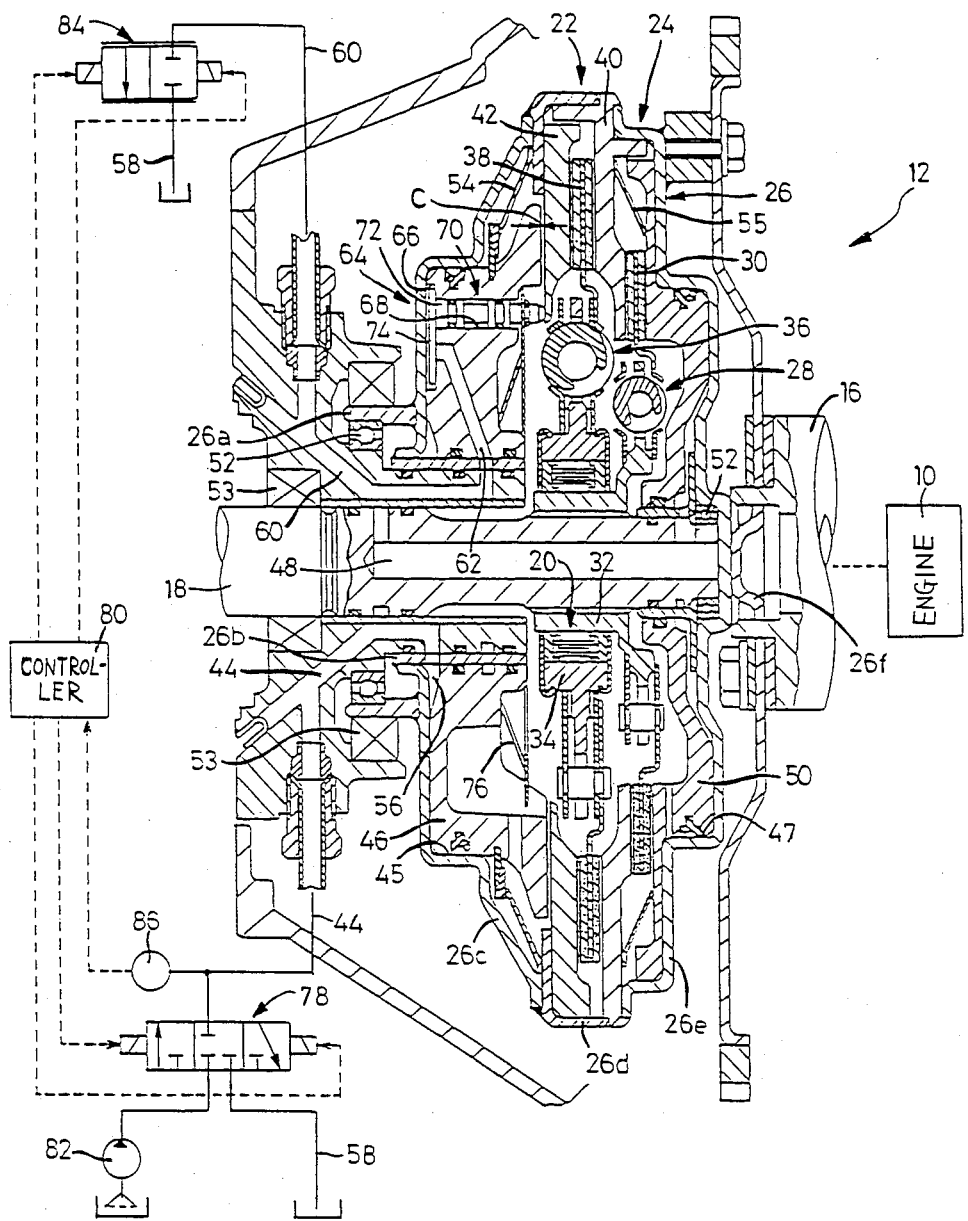
FIG. 1 is an elevational view in cross section of one embodiment of a clutch device of this invention.

Referring first to FIG. 1, there is shown a power transmitting system for an automotive vehicle wherein power produced by an engine 10 is transmitted to drive wheels of the vehicle via a clutch device 12, a constant-mesh transmission (not shown) having a plurality of reduction ratios, a differential gear device (not shown), and other components. The transmission may be constructed as disclosed in U.S. patent application, Ser. No. 929,055, filed on Nov. 10, 1986, now U.S. Pat. No. 4,723,643 assigned to the assignee of the present application.

The clutch device 12 includes an input shaft 16 which is a crankshaft of the engine 10, and an output shaft 18 coupled to an input shaft of the constant-mesh transmission The clutch device 12 further includes a first clutch 22 and a second clutch 24 which are disposed in parallel relation with each other. The first clutch 22 has a one-way clutch 20 adapted to effect power transmission only in the direction from the engine 10 toward the constant-mesh transmission. The second clutch 24 is adapted to directly couple the input and output shafts 16, 18, for applying an engine brake to the vehicle. The first clutch 22 is constructed according to the principle of the present invention.

The clutch device 12 has a clutch housing 26 which is attached to the end of the input shaft 16 remote from the engine 10. The housing 26 accommodates the first and second clutches 22, 24, and the end portion of the output shaft 18, and consists of mutually connected elements 26a, 26b, 26c, 26d, 26e and 26f. The clutch housing 26 cooperates with a friction plate 40, a pressure plate 42, pistons 46, 50 (which will be described), and other elements, to constitute a driving rotary member.

The output shaft 18 and the clutch housing 26 are arranged so that these two rotary members are rotatable relative to each other. The output shaft 18 has a second hub 32 splined thereto, and the second hub 32 supports a second rotor 30 fixed thereto by means of a second damper 28. A first hub 34 is mounted on the second hub 32, with the one-way clutch 20 interposed therebetween, such that the first and second hubs 34, 32 are rotatable relative to each other. The first hub 34 is adapted to support a first rotor 38 fixed thereto by means of a first damper 36. Between the first and second rotors 38, 30 within the housing 26, there is disposed the annular friction plate 40 which is secured to the housing 26. To force the first rotor 38 against the friction plate 40, the pressure plate 42 is disposed such that the plate 42 is axially movable relative to the first rotor 38. The first and second rotors 38, 30 constitute a driven rotory member, and are lined with a friction material. Further, the pressure plate 42 also functions as a movable member which is axially moved to effect frictional coupling between the driving and driven rotary members.

A cylinder bore 45 is defined within one end portion of the clutch housing 26 remote from the input shaft 16. An annular first actuator piston 46 is received in the cylinder bore 45, such that the piston 46 is axially slidable by a pressurized working fluid which is supplied through a first control valve 78 and a fluid passage 44. The pressure plate 42 is activated directly by the first piston 46. Similarly, another cylinder bore 47 is defined in the other end portion of the housing 26 nearer to the input shaft 16. An annular second actuator piston 50 is received in the cylinder bore 47, such that the piston 50 is axially slidable by a fluid supplied through another fluid passage 48, in order to force the second rotor 30 against the friction plate 40. Reference numerals 52, 53, 54 and 55 designate a bearing, an oil seal, a first return spring for biasing the first piston 46, and a second return spring for biasing the second piston 50, respectively.

The first piston 46 cooperates with the housing 26 or cylinder bore 45 to define a pressure chamber 56 connected to the fluid passage 44, and has a control passage 62 which connects the pressure chamber 56 to a discharge passage 60 leading to a drain 58. This control passage 62 is normally closed by a shut-off valve 64 which is normally placed in its closed position. The shut-off valve 64 is moved to its open position to open the control passage 62, when the first piston 46 has reached a predetermined position relative to the pressure plate 42. Described more specifically, the first piston 46 has a shallow round recess 66 in its pressure receiving surface exposed to the pressure chamber 56. This round recess 66 communicates with one end of the control passage 62, and with a through-hole 68 which is formed through the first piston 46. The shut-off valve 64 has a valving member 70 whose shaft portion 72 is axially slidably and fluid-tightly received within the through-hole 68. The valving member 70 has a closure member in the form of a flange portion 74 fixed to its one end on the side of the round recess 66. The flange portion 74 is loosely fitted in the round recess 66, so as to close the open end of the control passage 62. The valving member 70 is so constructed that its other end remote from the flange portion 74 projects a predetermined small distance C, for example, about 0.5 mm, away from the operating surface of the first piston 46 facing the pressure plate 42, while the valving member 70 is positioned in its first position or fully closed position to close the control passage 62. In this arrangement, when the first piston 46 has reached a predetermined position about 0.5 mm away from the pressure plate 42, the valving member 70 contacts the pressure plate 42 at its end of the shaft portion 72. With a further advancing movement of the piston 46, the valving member 70 is pushed back to its fully open position (in a direction toward the round recess 66) against the biasing action of a sheet spring 76, until the first piston 46 has abutted on the pressure plate 42. As a result, the flange portion or the closure member 74 is moved away from the open end of the control passage 62, by a distance of about 0.5 mm. Thus, in the present embodiment, the shut-off valve 64 includes the valving member 70, the round recess 66 and the through-hole 68, and the bottom surface of the round recess 66 constitutes a valve seat on which the flange portion 74 is seated. Further, the end of the shaft portion 72 serves as an actuator protrusion for operating the shut-off valve 64. The components within the clutch housing 26 are lubricated with an oil supplied through an inlet formed through the housing 26, and the oil is discharged through an outlet also formed through the housing 26, so that the pressure within the housing 26 may be kept at a comparatively low pressure.

The first control valve 78 previously indicated is a three-position, solenoid-operated directional control valve which is operated in response to electric signals from a controller 80, selectively to one of three positions: first or supply position in which a pressurized fluid from a hydraulic pump 82 is supplied to the fluid passage 44; second or discharge position in which the fluid is discharged from the fluid passage 44 to the drain 58; and third or neutral position in which the fluid passage 44 is disconnected from the pump 82 and the drain 58. A pressure sensor 86 is provided in the fluid passage 44, to sense the pressure within the passage 44. A signal from the pressure sensor 86 is applied to the controller 80. The discharge passage 60 is connected to a second control valve 84 in the form of a two-position solenoid-operated valve which is controlled according to signals from the controller 80, so that the valve 84 is selectively placed in a closed position for closing the discharge passage 60, and a discharge position for connecting the discharge passage 60 to the drain 58.

The controller 80 consists of a so-called microcomputer which is operated according to a stored control program, to control a shift actuator (not shown) of the constant-mesh transmission, depending upon various parameters of the vehicle such as the position of a shift lever, the gear position of the constant-mesh transmission, the opening of a throttle valve and the vehicle speed. Also, the controller 80 is adapted to control the first clutch 22, in relation to the shifting operation of the constant-mesh transmission, or the vehicle starting operation, and is further adapted to control the second clutch 24 for applying an engine brake to the vehicle, according to the control program, depending upon the vehicle speed, the throttle valve opening, the selected gear position of the constant-mesh transmission, and other parameters.

There will next be described the operation of the first clutch 22 according to the present invention.

To engage the first clutch 22 for transmitting a torque from the input shaft 16 to the output shaft 18, the controller 80 generates signals to place the first control valve 78 in its supply position, and the second control valve 84 in its closed position. Consequently, the first piston 46 is moved toward the input shaft 16 to move the pressure plate 42, for forcing the first rotor 38 against the friction plate 40, whereby the torque or power produced by the engine 10 is transmitted to the output shaft 18, through the input shaft 16, clutch housing 26, friction plate 40 and pressure plate 42, first rotor 38, first damper 36, first hub 34, one-way clutch 20 and second hub 32. In this condition, the pressure in the pressure chamber 56 is detected by the pressure sensor 86, and the controller 80 maintains the first control valve 78 in its supply position until the detected pressure in the pressure chamber 56 has reached a predetermined level. When the pressure has exceeded the predetermined level, the controller 80 returns the first control valve 78 to its neutral position.

To disengage the first clutch 22, the controller 80 generally controls the first and second control valves 78, 84, so as to place the first control valve 78 in its discharge position while holding the second control valve 84 in its closed position. As a consequence, the pressure in the pressure chamber 56 is discharged into the drain 58 through the fluid passage 44 and the first control valve 78, whereby the first piston 46 is returned under the biasing action of the first return spring 54, and the power transmission by the first clutch 22 is interrupted. In the case where it is necessary to rapidly disengage the first clutch 22, the second control valve 84 is also placed in its discharge position. If it is necessary to slowly disengage the first clutch 22, the second control valve 84 is placed in its discharge position while the first control valve 78 is in the supply position.

Figure 2:
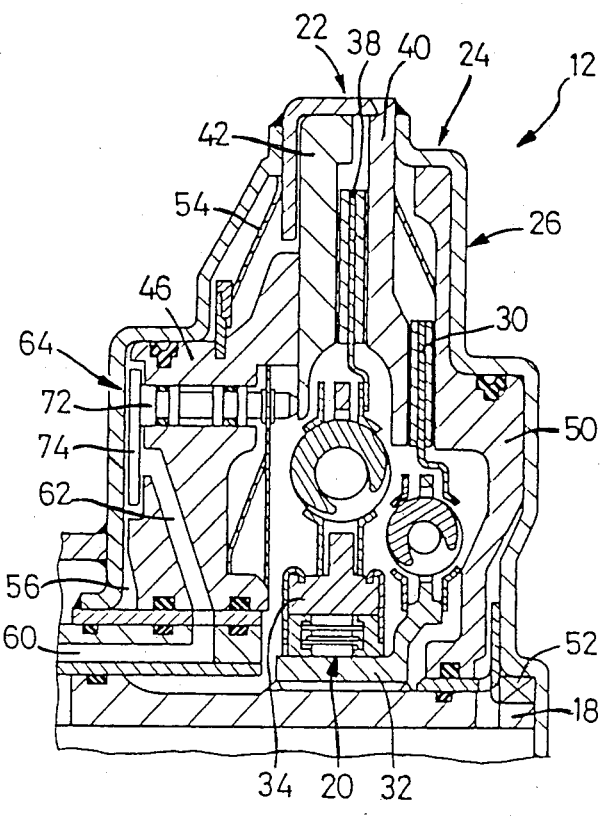
FIG. 2 is a fragmentary elevational view of the clutch device of FIG. 1, showing a first piston that has reached its ready position.

After the first clutch 22 has been disengaged in the manner described above, the controller 80 operates to move the first control valve 78 to the supply position, and the second control valve 84 to the discharge position, before the first clutch 22 is again engaged. Consequently, the first piston 22 is advanced to a ready-to-operate position which is spaced a slight distance away from the pressure plate 42, irrespective of an excessive wear of the first rotor 38 or other members. Stated in greater detail, the first piston 46 is exposed to the pressure in the pressure chamber 56 applied thereto through the first control valve 78, and is therefore advanced until the shut-off valve 64 is moved to its second or partially open position, more precisely until a thrust of the first piston 46 based on the pressure in the pressure chamber 56 becomes substantially equal to a sum of biasing forces of the first return spring 54 and the sheet spring 76. In this position of FIG. 2, the flange portion 74 of the shut-off valve 64 is spaced a short distance away from the valve seat, i.e., the bottom of the round recess 66, whereby the control passage 62 is held open. Accordingly, the pressure in the pressure chamber 56 is released into the drain 58 through the control passage 62, discharge passage 60 and second control valve 84. Thus, the first piston 46 is held in its ready-to-operate position. In this condition, the pressure plate 42 is held almost in contacting relation with the first rotor 38, while being pushed by a comparatively small baising force of the sheet spring 76. According to the instant arrangement, a further forward movement of the first piston 46 will immediately cause the first piston 46 to engage the pressure plate 42, that is, permit immediate engagement of the first clutch 22.

As described above, the first piston 46 is normally placed in its ready-to-operate position which is a predetermined constant small distance away from the surface of the pressure plate 42, irrespective of an amount of wear of the friction members such as the first rotor 38. This distance is established by the shut-off valve 64 in the manner as described above. Hence, when the controller 80 commands the first control valve 78 to be placed in the supply position, and the second control valve 84 to be placed in its closed position, a constant small distance of advancement of the first piston 56 due to an increase in the pressure in the pressure chamber 56 will effect immediate or rapid frictional engagement or coupling actions between the pressure plate 42 and the first rotor 38, and between the first rotor 38 and the friction plate 40, to start transmission of power through the clutch device 12.

Thus, the instant arrangement assures consistently rapid engagement of the first clutch 22, or a constant engagement time of the clutch 22, irrespective of the wear condition and engagement characteristic of the first clutch 22. In other words, the first clutch 22 may be smoothly engaged with a constant short response time, upon starting of the vehicle and shifting of the constant-mesh transmission, giving the vehicle operator smooth vehicle-start and transmission-shift feels. Further, the instant clutch arrangement does not require a complicated control based on acquired information on the amount of wear of the clutch components, and consequently permits the use of a relatively simple and inexpensive electronic control arrangement.

While the present invention has been described in its preferred embodiment, the invention may be otherwise embodied.

For example, the principle of the invention may be applied to the second clutch 24 as well as the first clutch 24, or to the second clutch 24 only. Further, the invention is applicable to a clutch device having a single driven rotor.

While the shut-off valve 64 is provided on a driving rotary member of the clutch, the valve 64 may be provided on one of the driven rotary members. For instance, the illustrated clutch device 12 of FIG. 1 may be used such that the shaft 18 serves as an input shaft connected to an engine. In this case, the first piston 46 having the shut-off valve 64 is a driven rotary member.

In the illustrated embodiment, the shaft and flange portions 72, 74 are formed as integral parts of the valving member 70, these parts may be separate shaft and closure disc. In this case, the shaft (72) may be secured to the pressure plate 42, and the sheet spring 76 may be eliminated, or replaced by a compression coil spring disposed between the disc (74) of the shut-off valve 64 and the clutch housing 26.

While the pistons 46, 50 used in the illustrated embodiment are coaxial or concentric with the respective clutches 22, 24, the principle of the invention is also applicable to a clutch device wherein a hydraulically operated cylinder is not concentric with a clutch, but is merely parallel to the axis of the clutch, as shown in Laid-Open Publication No. 60-11722 (published in 1985) of Japanese Patent Application. In this case, the piston of the hydraulic cylinder consists of a first and a second members which are separate from each other. The first member is operatively connected to the pressure plate (movable member) of the clutch, while the second member is exposed to a hydraulic pressure to move the first member of the piston, and consequently the pressure plate of the clutch. In this case, the second member of the piston has a control passage (62) formed therethrough, and a shut-off valve (64) which is adapted to normally close the control passage, and open the passage when the second member has reached a predetermined position relative to the first member of the piston.

It is to be understood that the present invention is not limited to the details of the illustrated embodiments and the modifications described above, but various other changes, modifications and improvements may be made in the invention, without departing from the sprit of the invention defined in the following claims.

What is claimed is:

1. A hydraulically operated friction clutch, comprising:
    a driving rotary member;
    a driven rotary member frictionally engageable with said driving rotary member;
    a movable member disposed coaxially with said driving and driven rotary members, and axially movable for frictional engagement of said driving and driven rotary members with each other;
    means for defining a cylinder bore;
    an actuator piston axially slidably received within said cylinder bore, and cooperating with said cylinder bore to define a pressure chamber;
    a first control valve for selectively applying a hydraulic pressure to said pressure chamber and thereby moving said actuator piston from a first stable position to move said movable member for the frictional engagement of said driving and driven rotary members;
    means for defining a discharge passage leading to a drain;
    said actuator piston having a through-hole, and a control passage which communicates at opposite ends thereof with said pressure chamber and said discharge passage;
    a shut-off valve disposed in operative association with said actuator piston and said movable member, said shut-off valve including a shaft member slidably received within said through-hole, and a closure member which is movable relative to said actuator piston and which has a first position for closing said control passage, and a second position for opening said control passage, said closure member being placed in said second position when said actuator piston has been moved to a second stable and ready-to-operate position which is a predetermined first distance away from said movable member;
    one of opposite ends of said shaft member projecting a predetermined second distance from a surface of said actuator piston facing said movable member, when said closure member is placed in said first position, said first distance being smaller than said second distance;
    a second control valve disposed in said discharge passage, for selectively closing said discharge passage such that said actuator piston can move to a third stable position; and
    a controller generating electric signals for controlling said first and second control valves.

2. A hydraulically operated friction clutch according to claim 1, wherein said actuator piston is coaxial with said driving and driven rotary members.

3. A hydraulically operated friction clutch according to claim 2, wherein said driving rotary member includes a friction plate, and said movable member consists of a pressure plate which is disposed axially movably between said actuator piston and said friction plate, said driven rotary member being disposed between said pressure plate and said friction plate so that said driven rotary member is forced by said pressure plate against said friction plate upon movement of said actuator piston from said ready-to-operate position toward siad driven rotary member.

4. A hydraulically operated friction clutch according to claim 1, wherein said closure member is integrally secured to the other axial end of said shaft member.

5. A hydraulically operated friction clutch according to claim 1, wherein said actuator piston has a recess exposed to said pressure chamber, said closure member being movably received in said recess, and said control passage being open at one of said opposite ends thereof in said recess so that said one end of the control passage is closed by said closure member placed in said first position.

6. A hydraulically operated friction clutch according to claim 1, wherein said actuator piston has a recess exposed to said pressure chamber, said closure member being movably received in said recess, and said control passage being open in said recess at one of said opposite ends thereof so that said one end of the control passage is closed by said closure member when said one axial end of said shaft member projects said predetermined second distance from said surface of the actuator piston.

7. A hydraulically operated friction clutch according to claim 1, wherein said driving rotary member comprises a housing in which said driven rotary member, said movable member and said actuator piston are accommodated, such that the movable member and the actuator piston are rotatable with the housing, relative to the driven rotary member, while the fricton clutch is disengaged.

8. A hydraulically operated friction clutch according to claim 7, further comprising an input shaft to which said housing is fixed, and an output shaft, and said driven rotary member includes a rotor splined on said output shaft.

9. A hydraulically operated friction clutch according to claim 8, wherein said input shaft is operatively connected to an engine of an automotive vehicle.

10. A hydraulically operated friction clutch according to claim 1, wherein said driving rotary member is operatively connected to an engine of an automotive vehicle.

11. A hydraulically operated friction clutch, comprising:
    a driving rotary member;
    a driven rotary member frictionally engageable with said driving rotary member;
    a movable member disposed coaxially with said driving and driven rotary members, and axially movable for frictional engagement of sad driving and driven rotary members with each other;
    means for defining a cylinder bore;
    an actuator piston axially slidably received within said cylinder bore, and cooperating with said cylinder bore to define a pressure chamber;
    means for defining a discharge passage leading to a drain;
    a first control valve having a supply position for supplying a pressurized fluid to said pressure chamber and thereby moving said actuator piston to move said movable member for the frictional engagement of said driving and driven rotary members, and a discharge position for permitting the pressurized fluid to be discharged from said pressure chamber to said drain;

said actuator piston having a control passage which communicates at opposite ends thereof with said pressure chamber and said discharge passage;

a shut-off valve disposed in operative association with said actuator piston and said movable member, said shut-off valve including a closure member which is movable relative to said actuator piston and which has a first position for closing said control passage, and a second position for opening said control passage, said closure member being placed in said second position when said actuator piston has been moved to a predetermined ready-to-operate position which is a predetermined distance away from said movable member;

a second control valve disposed in said discharge passage, and having an open position for opening said discharge passage and a closed position for closing said discharge passage; and a controller generating electric signals for controlling said first and second control valves, said controller placing said first control valve in said supply position and said second control valve in said closed position, for effecting the frictional engagement of said driving and driven rotary members.

12. A hydraulically operated friction clutch according to claim 11, wherein said controller places at least one of said first and second control valves in corresponding one of said discharge and open positions, for releasing said frictional engagement of said driving and driven rotary members.

13. A hydraulically operated friction clutch according to claim 12, wherein said controller places said first control valve in said supply position, and said second control valve in said open position, to move said actuator piston to said ready-to-operate position before each frictional engagement of said driving and driven rotary members.

* * * * *